United States Patent
Yen et al.

(10) Patent No.: US 11,210,226 B2
(45) Date of Patent: Dec. 28, 2021

(54) DATA STORAGE DEVICE AND METHOD FOR FIRST PROCESSING CORE TO DETERMINE THAT SECOND PROCESSING CORE HAS COMPLETED LOADING PORTION OF LOGICAL-TO-PHYSICAL MAPPING TABLE THEREOF

(71) Applicant: Silicon Motion, Inc., Jhubei (TW)

(72) Inventors: Jui-Lin Yen, Taipei (TW); Sheng-Hsun Lin, Magong (TW); Jian-Wei Sun, Taipei (TW)

(73) Assignee: SILICON MOTION, INC., Jhubei (TW)

( * ) Notice: Subject to any disclaimer, the term of this patent is extended or adjusted under 35 U.S.C. 154(b) by 36 days.

(21) Appl. No.: 16/851,572

(22) Filed: Apr. 17, 2020

(65) Prior Publication Data

US 2020/0356491 A1    Nov. 12, 2020

(30) Foreign Application Priority Data

May 6, 2019    (TW) .................................. 108115525

(51) Int. Cl.
*G06F 12/0866*    (2016.01)

(52) U.S. Cl.
CPC ...... *G06F 12/0866* (2013.01); *G06F 2212/50* (2013.01); *G06F 2212/7201* (2013.01)

(58) Field of Classification Search
CPC ........ G06F 12/0866–0868; G06F 15/163–167; G06F 2212/7201
See application file for complete search history.

(56) References Cited

U.S. PATENT DOCUMENTS

| | | | |
|---|---|---|---|
| 2008/0301397 A1* | 12/2008 | Goh ..................... | G06F 12/0875 711/202 |
| 2015/0177985 A1 | 6/2015 | Kondo et al. | |
| 2017/0068615 A1 | 3/2017 | Nagata | |
| 2018/0052768 A1 | 2/2018 | Bae et al. | |
| 2018/0217751 A1 | 8/2018 | Agarwal et al. | |
| 2019/0051361 A1 | 2/2019 | Park | |
| 2020/0218455 A1* | 7/2020 | Cho ....................... | G06F 3/0659 |
| 2020/0278797 A1* | 9/2020 | Bavishi ................. | G06F 3/0613 |

FOREIGN PATENT DOCUMENTS

| | | |
|---|---|---|
| CN | 108376102 A | 8/2018 |
| CN | 108376120 A | 8/2018 |
| TW | 201911057 A | 3/2019 |

* cited by examiner

*Primary Examiner* — Chie Yew
(74) *Attorney, Agent, or Firm* — McClure, Qualey & Rodack, LLP (57) ABSTRACT

A data storage device is provided. The data storage device includes a flash memory, a dynamic random access memory (DRAM), and a memory controller. The flash memory is configured to store a logical-to-physical mapping (L2P) table that is divided into a plurality of group-mapping (G2P) tables. The memory controller includes a first processing core and a second processing core. The first processing core receives a host access command from a host. When a specific G2P table corresponding to a specific logical address in the host access command is not stored in the DRAM, the first processing core determines whether the second processing core has loaded the specific G2P table from the flash memory to the DRAM according to the values in a first column in a first bit map and in a second column of a second bit map.

19 Claims, 5 Drawing Sheets

DATA STORAGE DEVICE AND METHOD FOR FIRST PROCESSING CORE TO DETERMINE THAT SECOND PROCESSING CORE HAS COMPLETED LOADING PORTION OF LOGICAL-TO-PHYSICAL MAPPING TABLE THEREOF

CROSS REFERENCE TO RELATED APPLICATIONS

This application claims priority of Taiwan Patent Application No. 108115525, filed on May 6, 2019, the entirety of which is incorporated by reference herein.

BACKGROUND OF THE INVENTION

Field of the Invention

The present invention relates to data storage devices and, in particular, to a data storage device and a method for loading a logical-to-physical mapping table thereof.

Description of the Related Art

Flash memory devices typically include NOR flash devices and NAND flash devices. NOR flash devices are random access—a host accessing a NOR flash device can provide the device any address on its address pins and immediately retrieve data stored in that address on the device's data pins. NAND flash devices, on the other hand, are not random access but serial access. It is not possible for NAND flash devices to access any random address in the same way as the NOR flash devices. Instead, the host has to write into the device a sequence of bytes which identifies both the type of command requested (e.g. read, write, erase, etc.) and the address to be used for that command. The address identifies a page (the smallest chunk of flash memory that can be written in a single operation) or a block (the smallest chunk of flash memory that can be erased in a single operation), and not a single byte or word. In reality, the NAND flash device always reads complete pages from the memory cells and writes complete pages to the memory cells. After a page of data is read from the array into a buffer inside the device, the host can access the data bytes or words one by one by serially clocking them out using a strobe signal.

However, as the capacity of the NAND flash memory increases, if the dynamic random access memory (DRAM) on the controller side completely records the entire logical-to-physical mapping table of the NAND flash memory, the capacity requirements of the DRAM is also quite large, resulting in higher costs. If a lower-capacity DRAM is used, the controller usually has to replace and update the group-mapping tables in the DRAM. However, with regard to a conventional memory controller having two processing cores, there is no efficient communication mechanism between the two processing cores, so that the main processing core has to waste time or system resources to determine whether another processing core has loaded the required group-mapping tables to the DRAM, resulting in lower performance of the data storage device.

Accordingly, there is a demand for a data storage device and a method for loading the logical-to-physical mapping table thereof to solve the aforementioned problem.

BRIEF SUMMARY OF THE INVENTION

In an exemplary embodiment, a data storage device is provided. The data storage includes a flash memory, a dynamic random access memory (DRAM), and a memory controller having a first processing core and a second processing core. The flash memory includes a plurality of blocks for storing data and a logical-to-physical (L2P) table, wherein the L2P table is divided into a plurality of group-mapping tables. The DRAM is configured to store a portion of the group-mapping tables, a first bit map, and a second bit map, wherein the first bit map comprises a plurality of first columns and the second bit map comprises a plurality of second columns, and each of the group-mapping tables corresponds to each of the first columns and each of the second columns. The first processing core is configured to receive a host command from a host, wherein the host command comprises one or more logical addresses. In response to the first processing core determining that a specific group-mapping table corresponding to a specific logical addresses in the one or more logical addresses is not stored in the DRAM, the first processing core toggles a first value in the first column of the first bit map corresponding to the specific group-mapping table, and writes a read command of the specific group-mapping table into a first-in-first-out (FIFO) buffer. The second processing core executes the read command from the FIFO buffer. In response to the second processing core successfully executing the read command to read the specific group-mapping table from the flash memory to the DRAM, the second processing core toggles a second value in the second column of the second bit map corresponding to the specific group-mapping table. The first processing core executes the host command according to the specific group-mapping table stored in the DRAM.

In some embodiments, when the data storage device is booted up, the first processing core resets each first column of the first bit map and each second column of the second bit map to 0. The first processing core determines that the specific group-mapping table has been stored in the DRAM in response to the first processing core determining that the first value in the first column of the first bit map and the second value in the second column of the second bit map corresponding to the specific group-mapping table are equal.

In some embodiments, in response to the specific read command of the specific group-mapping table having been written into the FIFO buffer by the first processing core, the first processing core continues to execute operations of the logical addresses subsequent to the specific logical address without waiting for the second processing core to complete the read command.

In some embodiments, in response to a predetermined condition being satisfied, the first processing core compares the first column of the first bit map and the second column of the second bit map corresponding to the specific group-mapping table to determine whether the specific group-mapping table has been stored in the DRAM. The predetermined condition indicates that the predetermined amount of time has passed after the first processing core has written the specific read command of the specific group-mapping table into the FIFO buffer, or the predetermined number of read commands corresponding to the logical addresses in the host command has been written into the FIFO buffer by the first processing core.

In some other embodiments, the predetermined condition indicates that the first processing core determines that the specific group-mapping table is required to perform associated operations of the host command. In response to the first processing core having executed the operations corresponding to the logical addresses subsequent to the specific logical address in the host command and/or the first processing core having written the read command of the group-mapping table corresponding to each logical address in the host command, the first processing core determines that the specific group-mapping table is required to perform the associated operations of the host command.

In another exemplary embodiment, a method for loading a logical-to-physical mapping (L2P) table in a data storage device is provided. The data storage device includes a flash memory, a dynamic random access memory (DRAM), a first processing core, and a second processing core. The flash memory comprises a plurality of blocks for storing data and the L2P table, and the L2P table is divided into a plurality of group-mapping tables. The DRAM stores a portion of the group-mapping tables, a first bit map, and a second bit map, wherein the first bit map comprises a plurality of first columns and the second bit map comprises a plurality of second columns, and each of the group-mapping tables corresponds to each of the first columns and each of the second columns. The method includes the steps of: utilizing the first processing core to receive a host command from a host, wherein the host command comprises one or more logical addresses; in response to a specific group-mapping table corresponding to a specific logical address not being stored in the DRAM, utilizing the first processing core to toggle a first value in the first column of the first bit map corresponding to the specific group-mapping table and to write a read command of the specific group-mapping table into a first-in-first-out (FIFO) buffer; utilizing the second processing core to execute the read command from the FIFO buffer; in response to the second processing core successfully executing the read command to read the specific group-mapping table from the flash memory to the DRAM, utilizing the second processing core to toggle a second value in the second column of the second bit map corresponding to the specific group-mapping table; and utilizing the first processing core to execute the host command according to the specific group-mapping table stored in the DRAM.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

Figure 1:
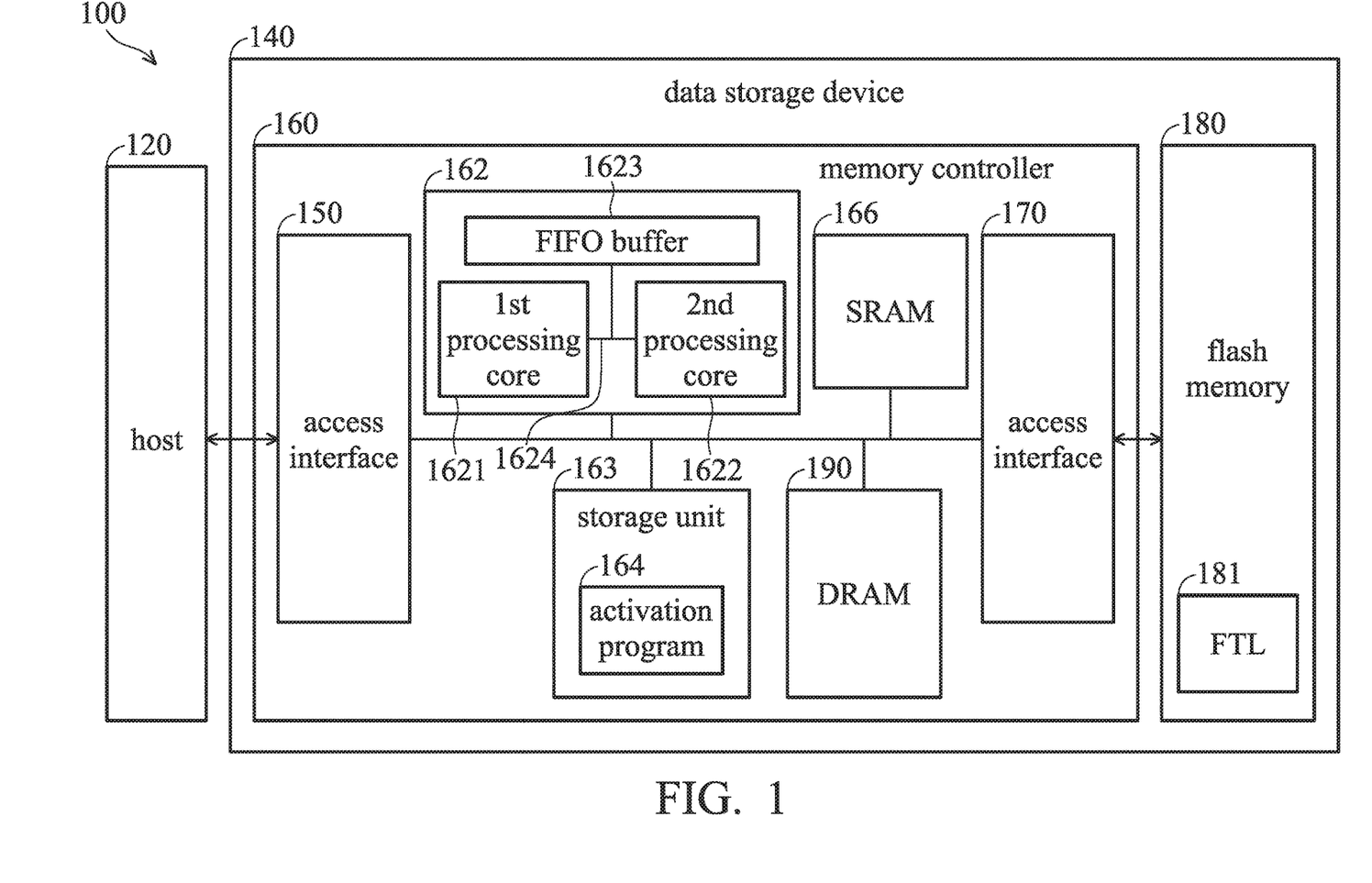
FIG. 1 is a block diagram of an electronic device in accordance with an embodiment of the invention.

FIG. 1 is a block diagram of an electronic device in accordance with an embodiment of the invention. The electronic device 100 may be a personal computer, a data server, a network-attached storage (NAS), a portable electronic device, etc., but the invention is not limited thereto. The portable electronic device may be a laptop, a hand-held cellular phone, a smartphone, a tablet PC, a personal digital assistant (PDA), a digital camera, a digital video camera, a portable multimedia player, a personal navigation device, a handheld game console, or an e-book, but the invention is not limited thereto.

The electronic device 100 includes a host 120 and a data storage device 140. The data storage device 140 includes a memory controller 160, a flash memory 180 and a dynamic random access memory (DRAM) 190. The controller 160 includes a processing unit 162, a storage unit 163, a static random-access memory (SRAM) 166. The processing unit 162 can be implemented in various manners, such as dedicated hardware circuits or general-purpose hardware (for example, a single processor, a multi-processor capable of performing parallel processing, or other processor with computation capability). For example, the processing unit 162 may be implemented by a general-purpose processor or a microcontroller, but the invention is not limited thereto. For purposes of description, the processing unit 162 may include a first processing core 1621 and a second processing core 1622 that communicate with each other via an internal bus 1624.

In some embodiments, the DRAM 190 can be substituted by a host memory buffer (not shown) in the host 120. The storage space of the DRAM 190 is larger than that of the SRAM 166.

The processing unit 162 in the controller 160 may control the flash memory 180 according to the command from the host 120, such as writing data to a designated address of the flash memory 180 or reading page data from a designated address from the flash memory 180.

In the electronic device 100, several electrical signals for coordinating commands and data transfer between the processing unit 162 and the flash memory 180, including data lines, a clock signal and control lines. The data lines are employed to transfer commands, addresses and data to be written and read. The control lines are utilized to issue control signals, such as CE (Chip Enable), ALE (Address Latch Enable), CLE (Command Latch Enable), WE (Write Enable), etc.

The access interface 170 may communicate with the flash memory 180 using a SDR (Single Data Rate) protocol or a DDR (Double Data Rate) protocol, such as ONFI (open NAND flash interface), DDR toggle, or others. The processing unit 162 may communicate with the host 120 through an access interface 150 using a designated communication protocol, such as USB (Universal Serial Bus), ATA (Advanced Technology Attachment), SATA (Serial ATA), PCI-E (Peripheral Component Interconnect Express), NVME (Non-volatile Memory Express), or others.

The storage unit 163 may be a non-volatile memory such as a read-only memory (ROM), an erasable programmable read-only memory (EPROM), an electrically erasable programmable read-only memory (EEPROM), or an e-fuse, but the invention is not limited thereto. The storage unit 163 may store an activation program 164. The activation program may include boot code or a boot loader that is executed by the processing unit 162, and the controller 160 may be booted up based on the activation program 164 to control operations of the flash memory 180, such as reading in-system programming (ISP) code.

The flash memory 180, for example, may be a NAND flash memory and the flash memory may include a plurality of flash memory dies or logical units (i.e., each having individual logical unit number (LUN)) that communicate with the processing unit 162 using the corresponding access sub-interface.

Figure 2:
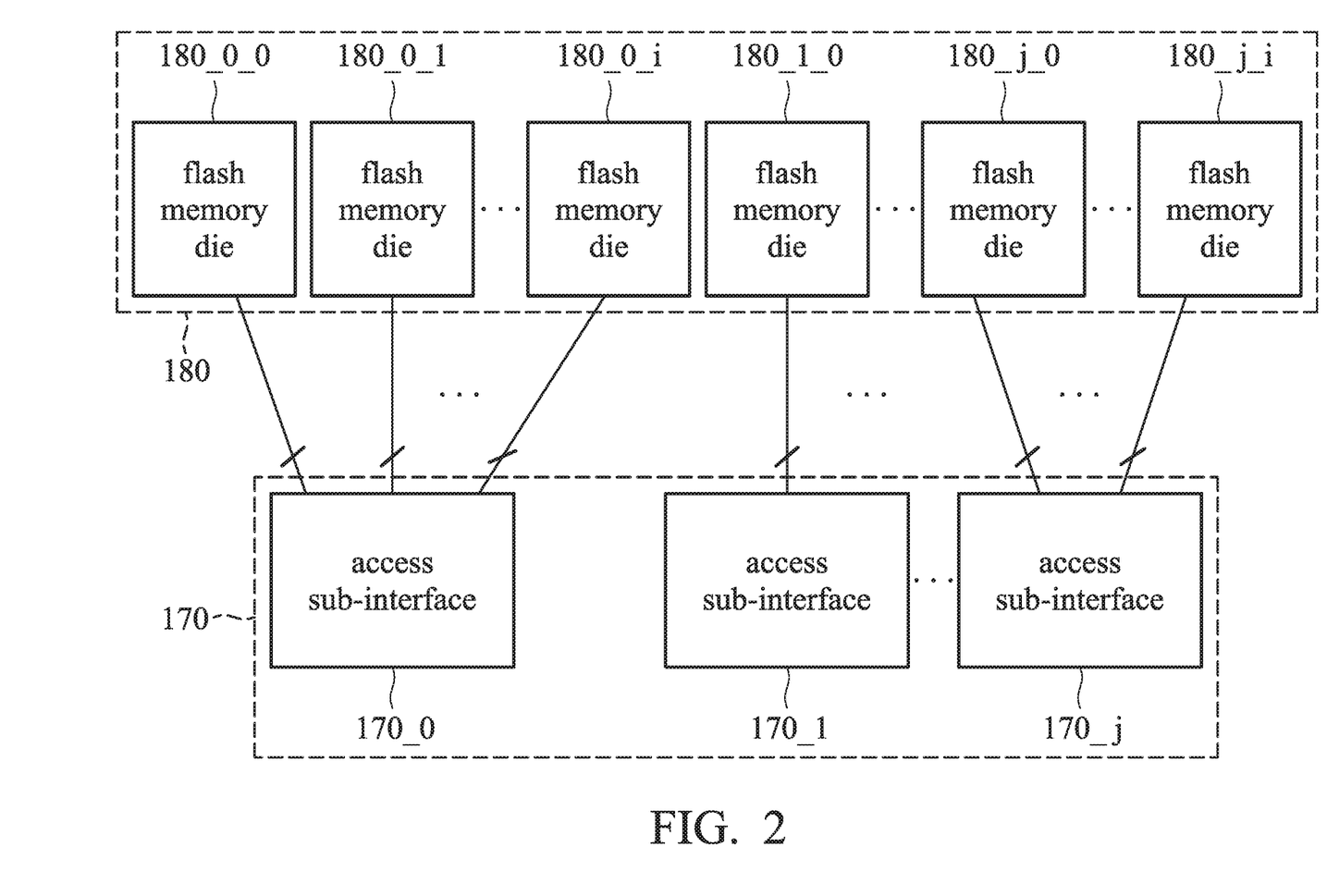
FIG. 2 is a schematic diagram illustrating interfaces to storage units of a flash storage in accordance with an embodiment of the invention.

FIG. 2 is a schematic diagram illustrating interfaces to storage units of a flash storage in accordance with an embodiment of the invention.

The data storage device 140 may contain j+1 access sub-interfaces 170_0 to 170_j, where the access sub-interfaces may be referred to as channels, and each access sub-interface connects to i+1 flash memory dies. That is, i+1 flash memory dies may share the same access sub-interface. For example, assume that the flash memory contains 4 channels (j=3) and each channel connects to 4 flash memory dies (i=3): The flash memory 10 has 16 flash memory dies 180_0_0 to 180_j_i in total. The processing unit 110 may direct one of the access sub-interfaces 170_0 to 170_j to read data from the designated flash memory die. Each flash memory die has an independent CE control signal.

Figure 3:
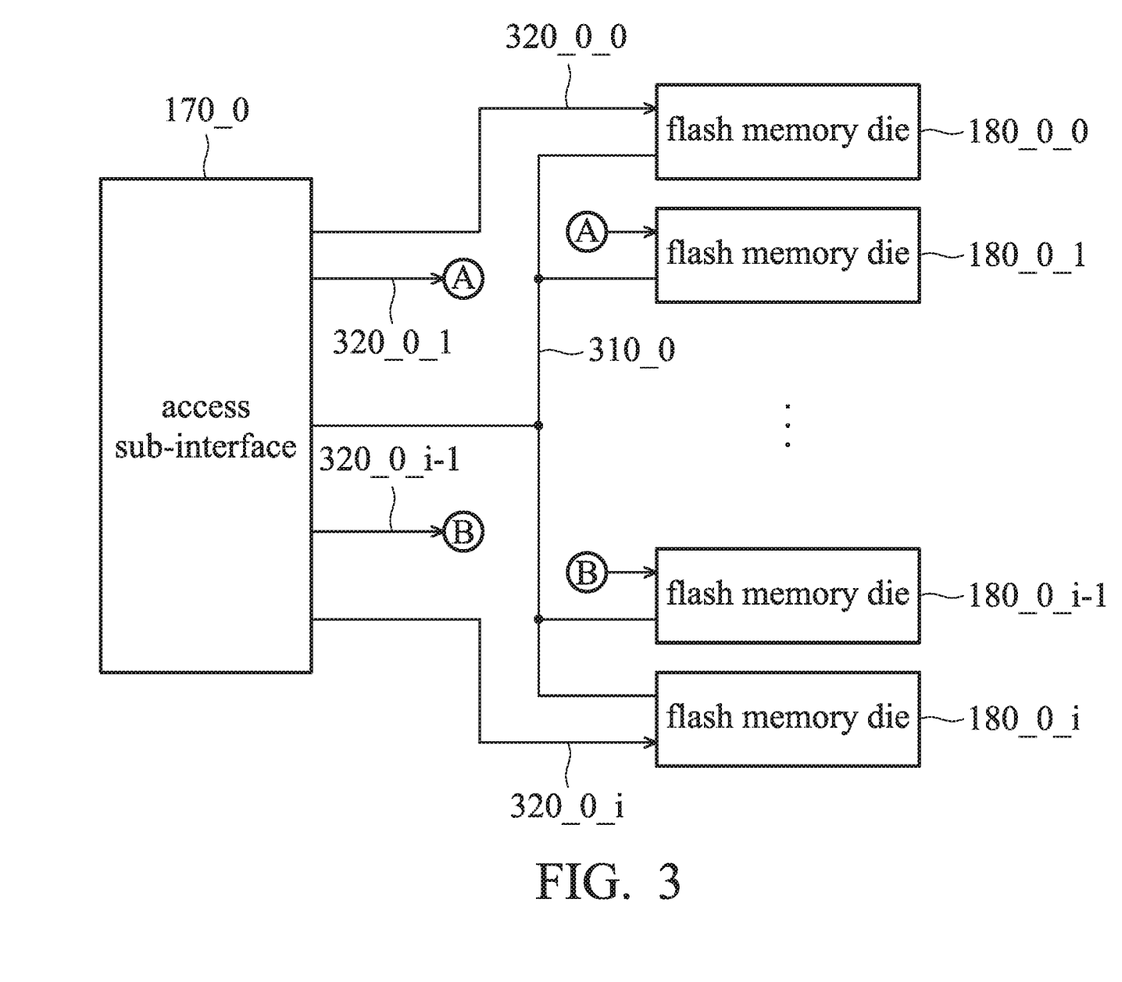
FIG. 3 is a schematic diagram depicting connections between one access sub-interface and multiple flash memory dies according to an embodiment of the invention.

That is, it is required to enable a corresponding CE control signal when attempting to perform data read from a designated flash memory die via an associated access sub-interface. FIG. 3 is a schematic diagram depicting connections between one access sub-interface and multiple flash memory dies according to an embodiment of the invention. The processing unit 162, through the access sub-interface 170_0, may use independent CE control signals 320_0_0 to 320_0_i to select one of the connected flash memory dies 180_0_0 and 180_0_i, and then read data from the designated location of the selected flash memory die via the shared data line 310_0.

In an embodiment, while the data storage device 140 is operating, the memory controller 160 may build and update the logical-to-physical mapping (L2P) table. The L2P table may be stored in the flash memory 180 of the data storage device 140, and may record the mapping information from the logical addresses to physical addresses. In addition, since the capacity of the DRAM 190 is limited (i.e., partial DRAM design) or the data storage device 140 is not equipped with the DRAM 190 and uses the host memory buffer (HMB) instead, the entire L2P table cannot be completely loaded into the DRAM 190 or the HMB. In this situation, the memory controller 160 may load a set of L2P table into the DRAM 190 or the HMB.

In some embodiments, the basic unit of the L2P table may be implemented by a page or a sector, wherein the logical address, for example, may be a logical block address (LBA) that corresponds to user data of 512 bytes. In some other embodiments, the logical addresses may be global host pages (GHPs), and each GHP may correspond to the user data of 4K bytes or 16K bytes. For brevity, the logical addresses are logical block addresses in the following embodiments, but the invention is not limited thereto.

Figure 4:
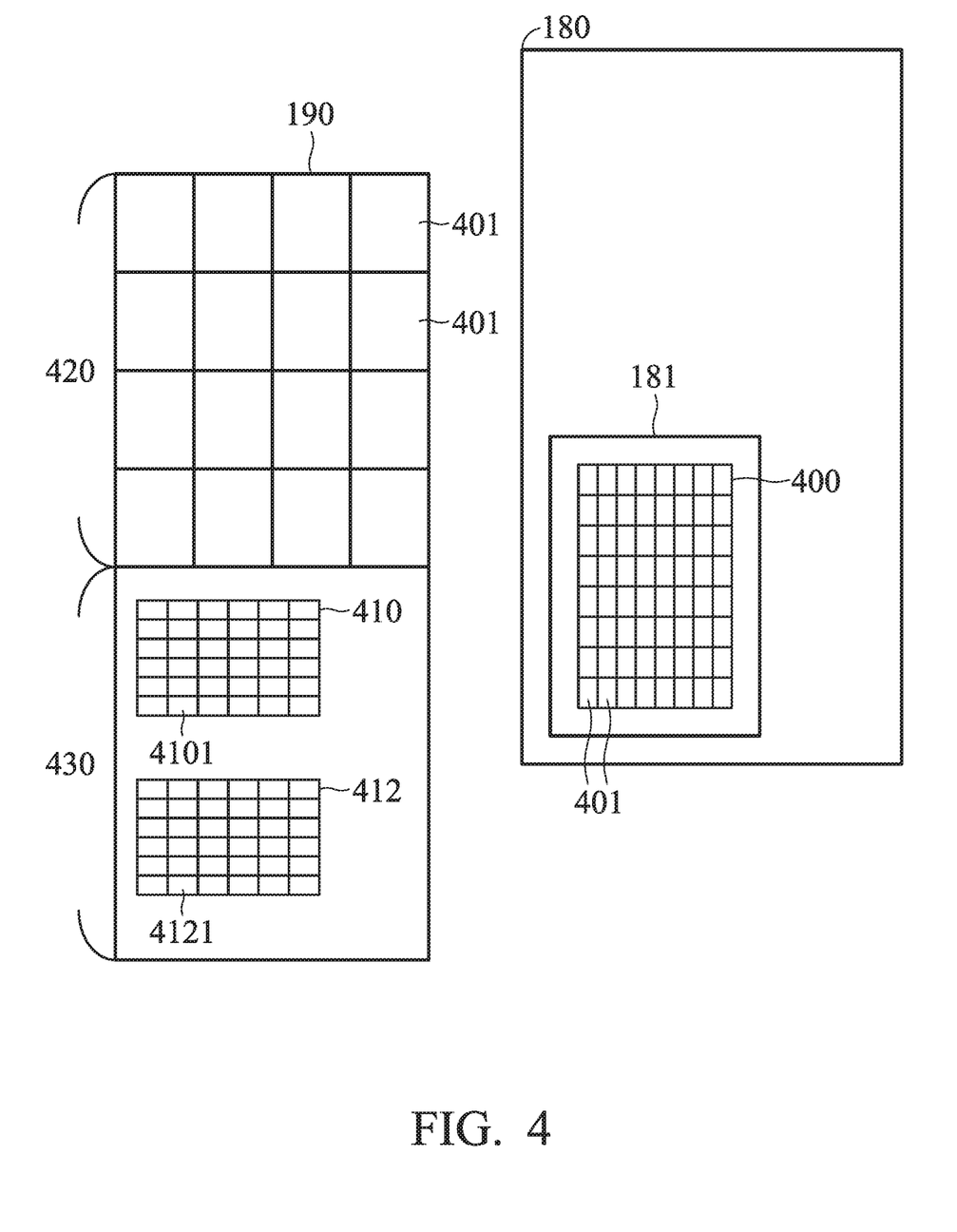
FIG. 4 is a diagram of the access information table and the logical-to-physical mapping table in accordance with an embodiment of the invention.

FIG. 4 is a diagram of a logical-to-physical mapping table, a request-bit table, and an acknowledgment-bit table in accordance with an embodiment of the invention.

In an embodiment, the L2P table 400, for example, can be evenly divided into a plurality of group-mapping (G2P) tables 401, such as 1024 group-mapping tables 401. The size of each group-mapping table 401 may be 4K bytes. Given that the size of each entry in each group-mapping table 401 is 4 bytes, each group-mapping table 401 may record 1024 pieces of mapping information. It should be noted that the size of each group-mapping table 401 can be set according to the requirement of practical designs, and the invention is not limited thereto. The memory controller 160, for example, may store a set of the group-mapping table 401 in the L2P table 400 to the first predetermined space 420 in the DRAM 190, such as 16 group-mapping tables 401, as depicted in FIG. 4.

For example, the memory controller 160 may receive one or more host commands from the host 120, and the host commands may be write command or read commands. For example, each host command may include one or more LBAs depending on the type of the host command (e.g., random write/read commands or sequential write/read commands).

In an embodiment, if the host command from the host 120 received by the memory controller 160 is a write command, the processing unit 162 of the memory controller 160 may determine whether the group-mapping table 401 corresponding to each LBA in the received host command has been stored in the DRAM 190. If the group-mapping table 401 corresponding to each LBA in the received host command has been stored in the DRAM 190, it is not necessary for the memory controller 160 to read any group-mapping table 401 from the flash memory 180. If the group-mapping tables corresponding to some or all of the logical addresses have not been stored in the DRAM 190, the memory controller 160 may read the corresponding mapping tables 401 from the flash memory 180 to the DRAM 190, such as using a predetermined replacement mechanism to replace the newly read one or more group-mapping tables 401 to replace one or more group-mapping tables 401 originally stored in the DRAM 190. For example, the aforementioned predetermined replacement mechanism may be implemented by a least recently used (LRU) algorithm, a least frequently used (LFU) algorithm, a first-in-first-out (FIFO) algorithm, a second chance algorithm, etc., but the invention is not limited thereto.

For example, the first processing core 1621 of the processing unit 162 may generate and sequentially write the one or more operation commands (e.g., read commands) corresponding to the one or more group-mapping tables 401 required by the host command into the first-in-first-out (FIFO) buffer 1623, and the second processing core 1622 may sequentially retrieve the read commands generated by the first processing core 1621 from the FIFO buffer 1623, execute the read commands to retrieve the required group-mapping tables 401, and write the retrieved group-mapping tables 401 to the DRAM 190. Afterwards, the second processing score 1622 may report the execution results associated with the read commands to the first processing core 1621, such as results of "completion" or "failure".

Specifically, the aforementioned predetermined replacement mechanism is determined by the first processing core 1621. For example, the first processing core 1621 may retrieve the physical addresses of the required group-mapping tables 401 according to a group-to-flash mapping (G2F) table, and then write the read commands, that include the physical address (e.g., including addresses of the flash memory dies) of the to-be-retrieved group-mapping tables 401 in the flash memory 180 and the physical addresses of the DRAM 190 to which the to-be-retrieved group-mapping tables are written, into the FIFO buffer 1623. The second processing core 1622 may retrieve the read commands from the FIFO buffer 1623 for execution. After the read command has been completed, it indicates that the group-mapping table 401 corresponding to the read command has been retrieved from the flash memory and written into the DRAM 190. There is a synchronization mechanism between the first processing core 1621 and the second processing core 1622, so that the second processing core 1622 may know there are new read commands in the FIFO buffer 1623. In addition, the second processing core 1622 may report the execution statuses about the read commands to the first processing core 1621. Alternatively, the second processing core 1622 may obtain the execution results of the read commands from the second processing core 1622. After the read commands have been completed, the first processing core 1621 may look up or update the content in the group-mapping tables 401 in the DRAM 190 according to the host command.

In the first embodiment, the first processing core 1621 may sequentially write one or more operation commands (e.g., read commands) corresponding to the one or more group-mapping tables 401 required by the host command into the FIFO buffer 1623, and the FIFO buffer 1623 may function as an command queue. The first processing core 1621 may wait for the second processing core 1622 to execute all read commands in the command queue. That is, when the FIFO buffer 1623 is at an empty status, the first processing core 1621 may know that the one or more group-mapping tables 401 required by the host command have been read and stored in the DRAM 190, and then the first processing core 1621 may continue to execute the host command.

In the second embodiment, which is similar to the first embodiment, the first processing core 1621 may actively check the processing status of the command queue in the FIFO buffer 1623, so that the group-mapping tables 401 that have been stored in the DRAM 190 can be known early by the first processing core 1621, and the first processing core 1621 may look up or update the content of these group-mapping tables 401.

However, in the synchronization mechanism of the first embodiment, the first processing core 1621 does not continue to perform subsequent operations until the second processing core 1622 have executed all the read commands in the command queue. This will cause the first processing core 1621 to be idle and unable to achieve the desired performance. In the synchronization mechanism of the second embodiment, the first processing core 1621 needs to additionally read the content of the command queue (e.g., head pointer, tail points, and data structure associated with the command queue) for determining the processing status of the read command or recording the mapping relationships of the indexes of the read commands in the command queue, which also causes the performance of the first processing core 1621 to be wasted.

In the third embodiment, a request-bit table 410 and an acknowledgement-bit (ack-bit) table 412 are arranged in the second predetermined space 430 of the DRAM 190, as depicted in FIG. 4, and the request-bit table 410 and the ack-bit table 412 are managed by the first processing core 1621 and the second processing core 1622, respectively. For example, the request-bit table 410 may include a plurality of columns 4101, and each column 4101 may correspond to one of the group-mapping tables 401 to represent the request status of the corresponding group-mapping table 401. The ack-bit table 4121 may include a plurality of column 4121, and each column 4121 may correspond to one of the group-mapping tables 401 to represent the acknowledge status of the corresponding group-mapping table 401. In some embodiments, the request-bit table 410 and the ack-bit table 412 can be arranged in the SRAM 166.

When the electronic device 100 is booted up, the first processing core 1621 (and/or the second processing core 1622) may reset all columns 4101 and 4121 in the request-bit table 410 and the ack-bit table 412, such as resetting all columns 4101 and 4121 to 0. When the processing unit 162 has received a host command and the first processing core 1621 determines that the operation corresponding a specific logical address in the host command needs to read a corresponding group-mapping table 401 (e.g., a specific group-mapping table) from the flash memory 180, the first processing core 1621 may toggle the value in the column 4101 of the request-bit table 410 corresponding to the specific group-mapping table to be retrieved. If the value in the column 4101 of the request-bit table 410 corresponding to the specific group-mapping table is originally 0, the first processing core 1621 may toggle the value in the column 4101 of the request-bit table 410 corresponding to the specific group-mapping table to 1. If the value in the column 4101 of the request-bit table 410 corresponding to the specific group-mapping table is originally 1, the first processing core 1621 may toggle the value in the column 4101 of the request-bit table 410 corresponding to the specific group-mapping table to 0.

After the first processing core 1621 has toggled the value in the column 4101 of the request-bit table 410 corresponding to the specific group-mapping table, the first processing core 1621 may write the operation command (e.g., a first read command) corresponding to the to-be-retrieved specific group-mapping table into the FIFO buffer 1623. For example, the first read command may include the physical address of the flash memory corresponding to the specific group-mapping table and the physical address (or logical address) of the DRAM 190 to which the specific group-mapping table retrieved from the flash memory 180 is written.

It should be noted that after the first processing core 1621 has written the read command corresponding to the to-be-retrieved specific group-mapping table into the FIFO buffer 1623, the first processing core 1621 can continue to execute other host command (e.g., host commands prior or latter to the current host command) without waiting for the second processing core 1622 to successfully load the specific group-mapping table from the flash memory 180 to the DRAM 190. For example, the first processing core 1621 may continue to perform prior host commands according to the group-mapping tables that have been stored in the DRAM 190. Alternatively, the first processing core 1622 may perform latter host commands to determine whether the group-mapping tables 401 required by the latter host commands have been stored in the DRAM 190 and whether to read the group-mapping tables 401 required by the latter host commands from the flash memory 180. If the first processing core 1621 determines to read the group-mapping tables 401 required by the latter host commands from the flash memory 180, the first processing core 1621 may toggle the columns corresponding to the required group-mapping tables 401 and write the read commands into the FIFO buffer 1623.

The second processing core 1622 may sequentially retrieve each of the read commands stored in the FIFO buffer 1623 for execution to retrieve the required specific group-mapping table 401 from the flash memory 180 and written the retrieved specific group-mapping table 401 to the DRAM 190 (i.e., the read command is completed), and then the second processing core 1622 may toggle the value in the column 4121 of the ack-bit table 412 corresponding to the retrieved specific group-mapping table 401. If the value in the column 4121 of the ack-bit table 412 corresponding to the retrieved specific group-mapping table 401 is 0, the second processing core 1622 may switch the value of in the column 4121 to 1. If the value in the column 4121 of the ack-bit table 412 corresponding to the retrieved specific group-mapping table 401 is 1, the second processing core 1622 may switch the value of in the column 4121 to 0. The second processing core 1622 may retrieve subsequent read commands from the FIFO buffer 1623 in a similar manner to retrieve the required group-mapping tables 401 from the flash memory 180, and toggle the value in the column 4121 of the ack-bit table 412 corresponding to each of the retrieved group-mapping tables.

It should be noted that the values in all columns 4101 and 4121 in the request-bit table 410 and ack-bit table 412 are reset to 0, and the data storage device 140 may repeatedly receive access commands from the host 120. When the first processing core 1621 issues the read commands corresponding to the specific group-mapping tables for the first time, the first processing core 1621 may toggle the value in the column 4101 of the request-bit table 410 corresponding to the specific group-mapping table to 1. After the second processing core 1622 have successfully read the specific group-mapping table from the flash memory 180 to the DRAM 190, the second processing core 1622 may toggle the value in the column 4121 of the ack-bit table 412 corresponding to the specific group-mapping table to 1.

However, the predetermined replacement mechanism performed by the first processing core 1621 may possibly replace the specific group-mapping table stored in the DRAM 190 with another group-mapping table 401. Accordingly, when the first processing core 1621 performs the subsequent host commands and issues the read command corresponding to the specific group-mapping table again, the first processing core 1621 may toggle the value in the column 4101 of the request-bit table 410 corresponding to the specific group-mapping table from 1 to 0. Similarly, after the second processing core 1622 has successfully read the specific group-mapping table from the flash memory 180 to the DRAM 190 again, the second processing core 1622 may toggle the value in the volume 4121 of the ack-bit table 412 corresponding to the specific group-mapping table from 1 to 0.

Specifically, after the first processing core 1621 has written the read command corresponding to the specific group-mapping table into the FIFO buffer 1623, in response to a predetermined condition being satisfied, the first processing core 1621 may compare the request-bit table 410 and the ack-bit table 412 to determine whether the specific group-mapping table has been successfully loaded from the flash memory 180 to the DRAM 190 by the second processing core 1622. For example, after the first processing core 1621 has written the read command corresponding to the specific group-mapping table into the FIFO buffer 1623, if the values in the columns of the request-bit table 410 and the ack-bit table 412 corresponding to the specific group-mapping table are identical (e.g., both are 0 or 1), it indicates that the specific group-mapping table has been successfully written into the DRAM 190. In addition, while comparing the request-bit table 410 and the ack-bit table 412, the first processing core 1621 may compare all columns 4101 of the request-bit table 410 with all columns 4121 of the ack-bit table 412, or alternatively compare the column 4101 of the request bit-table with the column 4102 of the ack-bit table 412 corresponding to the specific group-mapping table.

In an embodiment, the aforementioned predetermined condition, for example, may indicate that first processing core 1621 may compare the request-bit table 410 and the ack-bit table 412 periodically or after a predetermined amount of time after the first processing core 1621 has written the read command corresponding to the specific group-mapping table into the FIFO buffer 1623. In addition, the aforementioned predetermined condition may indicate that the first processing core 1621 may compare the request-bit table 410 and the ack-bit table 412 in response to a predetermined number of read commands having been written into the FIFO buffer 1623.

Alternatively or additionally, the aforementioned predetermined condition may indicate that the first processing core 1621 determines that the specific group-mapping table is required to perform associated operations, such as the first processing core 1621 has completed the operations corresponding to the logical addresses subsequent to the specific logical address in the current host command (e.g., the group-mapping tables corresponding to the subsequent logical addresses in the current host command have been stored in the DRAM 190), and/or the first processing core 1621 has written the read commands that correspond to the group-mapping tables of the subsequent logical addresses in the current host command in the FIFO buffer 1623.

For example, the first processing core 1621 may sequentially determine that the group-mapping table 401 corresponding to each logical address in the current host command has been stored in the DRAM 190. If the first processing core 1621 determines that the specific group-mapping table corresponding to the specific logical address has been stored in the DRAM 190, the first processing core 1621 may execute the operations corresponding to the specific logical addresses, such as reading page data according to the physical address of the flash memory 180 recorded by the specific group-mapping table, or updating the content of the specific group-mapping table according to the physical address of the super page after writing the super page including the specific group-mapping table. If the first processing core 1621 determines that the specific group-mapping table corresponding to the specific logical address in the current host command has not been stored in the DRAM 190 yet, the first processing core 1621 may directly execute the operations corresponding to the logical addresses subsequent to the specific logical addresses in the current host command without waiting for the second processing core 1622 to read the specific group-mapping table from the flash memory 180 to the DRAM 190 (i.e., completing the read command corresponding to the specific group-mapping table).

If the status about whether the group-mapping table corresponding to each logical address in the current host command has been stored in the DRAM 190 has been determined, the first processing core 1621 may sequentially determine whether the read command of the group-mapping table that has not been stored in the DRAM corresponding to each logical address in the current host command is executed. In response to the predetermined condition being satisfied, the first processing core 1621 may read the request-bit table 410 and the ack-bit table 412 from the DRAM 190 (or the SRAM 166), and comparing all columns 4101 and 4121 in the request-bit table 410 and ack-bit table 412.

Figure 5:
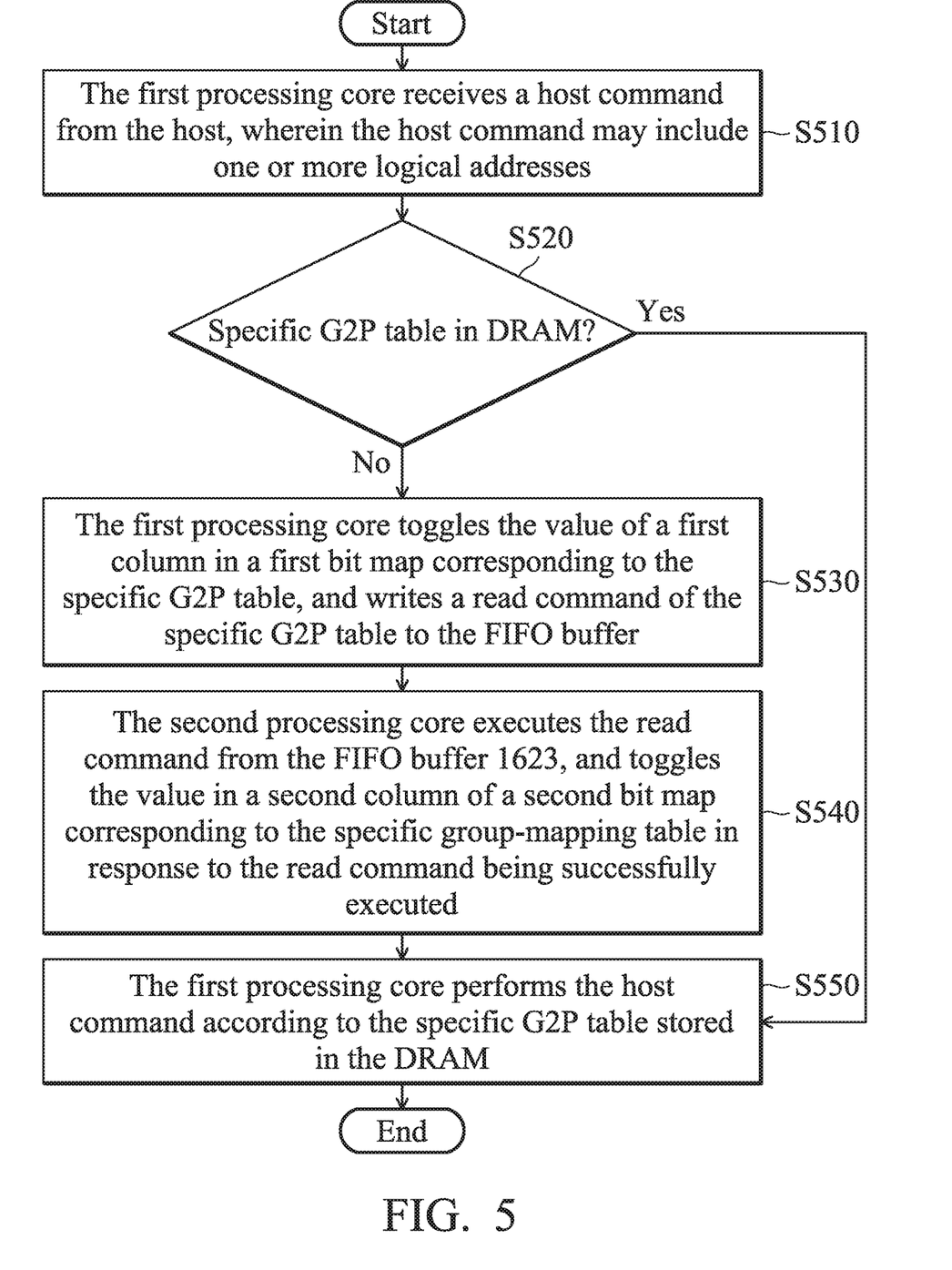
FIG. 5 is a flow chart of a method for loading the logical-to-physical mapping table in accordance with an embodiment of the invention.

FIG. 5 is a flow chart of a method for loading the logical-to-physical mapping table in accordance with an embodiment of the invention.

Referring to FIG. 1, FIG. 4, and FIG. 5, in step S510, the first processing core 1621 receives a host command from the host 120, wherein the host command may include one or more logical addresses. The host command may be a write command or a read command. For example, the host command may be a read command reading page data corresponding to logical block addresses LBA #100~#107.

In step S520, the first processing core 1621 determines whether a specific group-mapping table corresponding to the one or more logical addresses in the host command is stored in the DRAM 190. If the specific group-mapping table is stored in the DRAM 190, step S550 is performed. In the specific group-mapping table is not stored in the DRAM 190, step S530 is performed. For example, the mapping relationships corresponding to the logical block addresses LBA #100~#107 may be recorded in the group-mapping table #0. Accordingly, the first processing core 1621 may determine whether the group-mapping table #0 is stored in the DRAM 190. If the group-mapping table #0 is not stored in the DRAM, step S530 is performed.

In step S530, the first processing core 1621 toggles the value of a first column in a first bit map (e.g., request-bit map 410) corresponding to the specific group-mapping table, and writes a read command of the specific group-mapping table into the FIFO buffer 1623. For example, the group-mapping table #0 corresponds to the column #0 in the request-bit map 410. Accordingly, the first processing core 1621 may toggle the value of the column #0 in the request-bit map 410, such as toggling the value of the column #0 in the request-bit map 410 from "0" to "1" or from "1" to "0", and write the read command of the group-mapping table #0 into the FIFO buffer 1623. For example, the read command may include the physical address of the group-mapping table #0 in the flash memory 180 (e.g., including the number of flash memory die and the physical address of the page data), and the physical address (or logical address) of the DRAM 190 in the first predetermined space 420 to which the retrieve group-mapping table #0 is written.

In step S540, the second processing core 1622 executes the read command from the FIFO buffer 1623, and toggles the value in a second column of a second bit map corresponding to the specific group-mapping table in response to the read command being successfully executed. For example, the second processing core 1622 may execute the read command from the FIFO buffer 1623 to retrieve the group-mapping table #0 from the flash memory 180, and write the retrieved group-mapping table #0 to the DRAM 190. The group-mapping table #0 corresponds to the column #0 of the ack-bit table 412, and the second processing core 1622 may toggle the value in the column #0 of the ack-bit table 412, such as toggling the value in the column #0 of the ack-bit table 412 from "1" to "0" or from "0" to "1".

In step S550, the first processing core 1621 performs the host command according to the specific group-mapping table stored in the DRAM 190. For example, the group-mapping table #0 may record the physical addresses corresponding to the logical block addresses LBA #100~#107, and the first processing core 1621 may read the page data stored in the physical addresses corresponding to the logical block addresses LBA #100~#107, and output the page data corresponding to the logical block addresses LBA #100~#107 to the host 120.

In view of the above, a data storage device and a method for loading the logical-to-physical mapping table are provided in the present invention. The data storage device and the method are capable of utilizing the first processing core and the second processing core in the memory controller of the data storage device to respectively manage the request-bit table and the ack-bit table in the condition that the memory space of the DRAM in the memory controller is not sufficient to store the entire logical-to-physical mapping table.

When the specific group-mapping table corresponding to the specific logical address in the host command is not stored in the DRAM 190, the first processing core 1621 may write the read command of the specific group-mapping table into the FIFO buffer and toggle the value in the column of the request-bit map corresponding to the specific group-mapping table. The second processing core 1622 may retrieve the read command from the FIFO buffer 1623 for execution. In response to the second processing core 1622 having successfully loaded the specific group-mapping table from the flash memory 180 to the DRAM 190, the second processing core 1622 may toggle the value in the column of the ack-bit table corresponding to the specific group-mapping table.

After the first processing core 1621 has written the read command corresponding to the specific group-mapping table into the FIFO buffer 1623, the first processing core 1621 can continue to perform other operations corresponding to the subsequent logical addresses in the host command without waiting the second processing core 1622 to complete the read command. In addition, the first processing core 1621 may compare the columns in the request-bit table and the ack-bit table corresponding to the specific group-mapping table in response to a predetermined condition being satisfied, thereby determining whether the specific group-mapping table has been stored in the DRAM 190. Accordingly, the performance of the data storage device having two processing cores can be improved in the present invention.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A data storage device, comprising:
a flash memory, comprising a plurality of blocks for storing data and a logical-to-physical (L2P) table, wherein the L2P table is divided into a plurality of group-mapping tables;
a dynamic random access memory (DRAM) configured to store a portion of the group-mapping tables, a first bit map, and a second bit map that is different from the first bit map, wherein the first bit map comprises a plurality of first columns, the second bit map comprises a plurality of second columns, and the plurality of group-mapping tables corresponds to the plurality of first columns and the plurality of second columns;

and a memory controller comprising a first processing core and a second processing core that is different from the first processing core, wherein the first processing core is configured to receive a host command from a host, wherein the host command comprises one or more logical addresses;

wherein in response to the first processing core determining that a specific group-mapping table, corresponding to a specific logical address in the one or more logical addresses, is not stored in the DRAM, the first processing core toggles a first value in a first column of the plurality of first columns, the first column corresponding to the specific group-mapping table, and writes a read command of the specific group-mapping table into a first-in-first-out (FIFO) buffer, wherein the second processing core executes the read command from the FIFO buffer, wherein in response to the second processing core successfully executing the read command to read the specific group-mapping table from the flash memory to the DRAM, the second processing core toggles a second value in a second column of the plurality of second columns, the second column corresponding to the specific group-mapping table, wherein the first processing core compares the first column of the first bit map and the second column of the second bit map to determine that the specific group-mapping table has been stored in the DRAM and the first processing core executes the host command according to the specific group-mapping table stored in the DRAM.

2. The data storage device as claimed in claim 1, wherein the read command written in the FIFO buffer by the first processing core comprises a physical address of the flash memory, the physical address corresponding to the specific group-mapping table, and a physical address of the DRAM to which the retrieved specific group-mapping is written.

3. The data storage device as claimed in claim 2, wherein when the data storage device is booted up, the first processing core resets, to 0, each column of the plurality of first columns of the first bit map and each column of the plurality of second columns of the second bit map.

4. The data storage device as claimed in claim 3, wherein the first processing core determines that the specific group-mapping table has been stored in the DRAM in response to the first processing core determining that the first value and the second value are equal.

5. The data storage device as claimed in claim 1, wherein in response to the read command of the specific group-mapping table having been written into the FIFO buffer by the first processing core, the first processing core continues to execute operations of logical addresses subsequent to the specific logical address without waiting for the second processing core to complete the read command.

6. The data storage device as claimed in claim 1, wherein:
in response to a predetermined condition being satisfied, the first processing core compares the first column and the second column to determine that the specific group-mapping table has been stored in the DRAM.

7. The data storage device as claimed in claim 6, wherein the predetermined condition indicates that a predetermined amount of time has passed after the first processing core has written the read command of the specific group-mapping table into the FIFO buffer, or a predetermined number of read commands corresponding to the one or more logical addresses in the host command has been written into the FIFO buffer by the first processing core.

8. The data storage device as claimed in claim 6, wherein the predetermined condition indicates that the first processing core determines that the specific group-mapping table is required to perform associated operations of the host command.

9. The data storage device as claimed in claim 8, wherein:
in response to i) the first processing core having executed operations corresponding to logical addresses subsequent to the specific logical address in the host command and/or ii) first processing core having written read command corresponding to each logical address in the host command, the first processing core determines that the specific group-mapping table is required to perform the associated operations of the host command.

10. A method for loading a logical-to-physical mapping (L2P) table in a data storage device, wherein the data storage device comprises a flash memory, a dynamic random access memory (DRAM), a first processing core, and a second processing core that is different from the first processing core, wherein the flash memory comprises a plurality of blocks for storing data and the L2P table, and the L2P table is divided into a plurality of group-mapping tables, and the DRAM stores a portion of the group-mapping tables, a first bit map, and a second bit map that is different from the first bit map, wherein the first bit map comprises a plurality of first columns and the second bit map comprises a plurality of second columns, and the plurality of group-mapping tables corresponds to the plurality of first columns and the plurality of second columns, the method comprising:
utilizing the first processing core to receive a host command from a host, wherein the host command comprises one or more logical addresses;
in response to a specific group-mapping table, corresponding to a specific logical address in the one or more logical addresses, being not stored in the DRAM, utilizing the first processing core to toggle a first value in a first column of the plurality of first columns, the first column corresponding to the specific group-mapping table and write a read command of the specific group-mapping table into a first-in-first-out (FIFO) buffer;
utilizing the second processing core to execute the read command from the FIFO buffer;
in response to the second processing core successfully executing the read command to read the specific group-mapping table from the flash memory to the DRAM, utilizing the second processing core to toggle a second value in a second column of the plurality of second columns, the second column corresponding to the specific group-mapping table;
utilizing the first processing core to compare the first column of the first bit map and the second column of the second bit map to determine that the specific group-mapping table has been stored in the DRAM and utilizing the first processing core to execute the host command according to the specific group-mapping table stored in the DRAM.

11. The method as claimed in claim 10, wherein the read command written in the FIFO buffer by the first processing core comprises a physical address of the flash memory, the physical address corresponding to the specific group-mapping table, and a physical address of the DRAM to which the retrieved specific group-mapping is written.

12. The method as claimed in claim 11, further comprising:
when the data storage device is booted up, utilizing the first processing core to reset, to 0, each column of the plurality of first columns of the first bit map and each column of the plurality of second columns of the second bit map.

13. The method as claimed in claim 12, wherein
in response to the first processing core determining that the first value and the second value are equal, utilizing the first processing core to determine that the specific group-mapping table has been stored in the DRAM.

14. The method as claimed in claim 10, further comprising:
in response to the read command of the specific group-mapping table having been written into the FIFO buffer by the first processing core, utilizing the first processing core to continue to execute operations of logical addresses subsequent to the specific logical address without waiting for the second processing core to complete the read command.

15. The method as claimed in claim 10, further comprising:
in response to a predetermined condition being satisfied, utilizing the first processing core to compare the first column and the second column to determine that the specific group-mapping table has been stored in the DRAM.

16. The method as claimed in claim 15, wherein the predetermined condition indicates that the predetermined amount of time has passed after the first processing core has written the read command of the specific group-mapping table into the FIFO buffer, or the predetermined number of read commands corresponding to the one or more logical addresses in the host command has been written into the FIFO buffer by the first processing core.

17. The method as claimed in claim 15, wherein the predetermined condition indicates that the first processing core determines that the specific group-mapping table is required to perform associated operations of the host command.

18. The method as claimed in claim 17, wherein utilizing the first processing core to determine that the specific group-mapping table is required to perform the associated operations of the host command further comprises:
in response to i) the first processing core having executed operations corresponding to logical addresses subsequent to the specific logical address in the host command and/or ii) the first processing core having written read command corresponding to each logical address in the host command, utilizing the first processing core to determine that the specific group-mapping table is required to perform the associated operations of the host command.

19. A memory controller, for use in a data storage device, wherein the data storage device comprises a flash memory and a dynamic random access memory (DRAM), the flash memory comprises a plurality of blocks for storing data and a logical-to-physical (L2P) table, wherein the L2P table is divided into a plurality of group-mapping tables, and the DRAM stores a portion of the group-mapping tables, a first bit map, and a second bit map that is different from the first bit map, wherein the first bit map comprises a plurality of first columns and the second bit map comprises a plurality of second columns, and the plurality of group-mapping tables corresponds to the plurality of first columns and the plurality of second columns, the memory controller comprising:
a processor, comprising a first processing core and a second processing core that is different from the first processing core, wherein the first processing core is configured to receive a host command from a host, wherein the host command comprises one or more logical addresses;
wherein in response to the first processing core determining that a specific group-mapping table corresponding to a specific logical address in the one or more logical addresses is not stored in the DRAM, the first processing core toggles a first value in a first column of the plurality of first columns, the first column corresponding to the specific group-mapping table, and writes a read command of the specific group-mapping table into a first-in-first-out (FIFO) buffer,
wherein the second processing core executes the read command from the FIFO buffer,
wherein in response to the second processing core successfully executing the read command to read the specific group-mapping table from the flash memory to the DRAM, the second processing core toggles a second value in a second column of the plurality of second columns, the second column corresponding to the specific group-mapping table,
wherein the first processing core compares the first column of the first bit map and the second column of the second bit map to determine that the specific group-mapping table has been stored in the DRAM and the first processing core executes the host command according to the specific group-mapping table stored in the DRAM.

* * * * *